(12) United States Patent
Chang et al.

(10) Patent No.: US 9,065,631 B2
(45) Date of Patent: Jun. 23, 2015

(54) INTEGRATED CRYPTOGRAPHIC MODULE PROVIDING CONFIDENTIALITY AND INTEGRITY

(75) Inventors: Ku Young Chang, Daejeon (KR); Seokhie Hong, Seoul (KR); Jesang Lee, Seoul (KR); Jaechul Sung, Seoul (KR); Jinkeon Kang, Seoul (KR)

(73) Assignees: ELECTRONICS AND TELECOMMUNICATIONS RESEARCH INSTITUTE, Daejeon (KR); KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 714 days.

(21) Appl. No.: 13/335,245

(22) Filed: Dec. 22, 2011

(65) Prior Publication Data

US 2012/0163587 A1 Jun. 28, 2012

(30) Foreign Application Priority Data

Dec. 23, 2010 (KR) .......................... 10-2010-0133553

(51) Int. Cl.
  *H04K 1/00* (2006.01)
  *H04L 9/00* (2006.01)
  *H04L 9/28* (2006.01)
  *H04L 9/06* (2006.01)

(52) U.S. Cl.
  CPC ............ *H04L 9/0618* (2013.01); *H04L 9/0643* (2013.01); *H04L 2209/122* (2013.01); *H04L 2209/805* (2013.01)

(58) Field of Classification Search
  CPC ............ H04L 2209/805; H04L 9/0618; H04L 9/0643; H04L 9/00; H04L 2209/72
  USPC .................................................... 380/259, 28
  See application file for complete search history.

(56) References Cited

U.S. PATENT DOCUMENTS

| 5,606,616 | A | 2/1997 | Sprunk et al. | |
|---|---|---|---|---|
| 8,774,407 | B2 * | 7/2014 | Eklund et al. | 380/255 |
| 2002/0048364 | A1 | 4/2002 | Gligor et al. | |
| 2002/0191791 | A1 * | 12/2002 | Anand | 380/255 |
| 2008/0019524 | A1 * | 1/2008 | Kim et al. | 380/259 |
| 2009/0060197 | A1 * | 3/2009 | Taylor et al. | 380/277 |

FOREIGN PATENT DOCUMENTS

| JP | 2008-52130 | 3/2008 |
|---|---|---|
| KR | 10-1997-0008912 | 2/1997 |

(Continued)

OTHER PUBLICATIONS

"Advanced Encryption Standard." Wikipedia. Wikimedia Foundation, Published May 12, 2010. Accessed Sep. 22, 2014. <http://en.wikipedia.org/w/index.php?title=Advanced_Encryption_Standard&oldid=361754908.*

(Continued)

*Primary Examiner* — Saleh Najjar
*Assistant Examiner* — Feliciano Mejia
(74) *Attorney, Agent, or Firm* — Staas & Halsey LLP (57) ABSTRACT

An integrated cryptographic apparatus providing confidentiality and integrity includes an integrated cryptographic module including confidentiality and integrity. Further, the integrated cryptographic apparatus includes a hash function unit for detecting whether a message is modified by using the integrated cryptographic module. Furthermore, the integrated cryptographic apparatus includes a block cipher unit for constructing a data encryption algorithm by using the integrated cryptographic module.

18 Claims, 6 Drawing Sheets

(56) References Cited

FOREIGN PATENT DOCUMENTS

| KR | 10-2008-0025354 | 3/2008 |
| KR | 10-2008-0044150 | 5/2008 |
| KR | 10-2008-0071697 | 8/2008 |

OTHER PUBLICATIONS

"One-Way Compression Function." Wikipedia. Wikimedia Foundation, Published Mar. 8, 2009. Accessed Sep. 23, 2014. <http://en.wikipedia.org/w/index.php?title=One-way_compression_function&oldid=275836798.*

"Padding (Cryptography)." Wikipedia. Wikimedia Foundation, Published, Nov. 30, 2009. Accessed Sep. 23, 2014. <http://en.wikipedia.org/w/index.php?title=Padding_(cryptography)&oldid=328872326>.*

Shoichi Hirose, "Some Plausible Constructions of Double-Block-Length Hash Functions", FSE 2006 LNCS 4047, pp. 210-225, 2006.

Bart Preneel et al., "Hash functions based on block ciphers: a synthetic approach", CRYPTO 93 LNCS 773, pp. 368-378, 1994.

* cited by examiner

INTEGRATED CRYPTOGRAPHIC MODULE PROVIDING CONFIDENTIALITY AND INTEGRITY

CROSS-REFERENCE TO RELATED APPLICATION(S)

The present invention claims priority of Korean Patent Application No. 10-2010-0133553, filed on Dec. 23, 2010, which is incorporated herein by reference.

FIELD OF THE INVENTION

The present invention relates to an integrated cryptographic technology; and, more particularly, to an integrated cryptographic module and a method thereof providing confidentiality and integrity, which is suitable for designing an integrated cryptographic module capable of using both a block cipher providing confidentiality and a hash function guaranteeing integrity in a resource-limited environment such as RFID (radio frequency identification) or USN (ubiquitous sensor network) in an ubiquitous computing environment.

BACKGROUND OF THE INVENTION

Generally, a cryptographic hash function is a compression function, which receives a bit string of arbitrary length and outputs a bit string of fixed length. The cryptographic hash function is for increasing security and efficiency of a cryptographic system.

The cryptographic hash function is used in various cryptographic systems such as internet banking, digital signature, message authentication code, key exchange algorithm, key generation algorithm, and pseudo random number generator, and the like. In the sense that safety of such cryptographic systems is based on that of hash function, it is important to design a secure hash function.

Currently, NIST (National Institute of Standards and Technology) recommends using SHA-224/256/384/512, outputs of which have 224, 256, 384, and 512 bits respectively, instead of MD5 or SHA-1. The NIST is currently undertaking the Cryptographic Hash Project for developing SHA-3 for 6 years from 2007 to 2012. As shown in the NIST's project, it is very necessary to develop a new secure and efficient hash function.

Meanwhile, block cipher, which is most commonly used among symmetric key algorithms, is an algorithm for ensuring confidentiality by encrypting data using a secret key shared between a transmitter and a receiver.

A representative block cipher is AES (Advanced Encryption Standard), which is the federal standard cipher. The AES is the next-generation standard algorithm to replace the DES (Data Encryption Standard), which has been used over 20 years as the federal standard cipher. The DES is developed by IBM in 1972 to protect computer data under the supervision of NBS (National Bureau of Standards), which is a former body of the NIST.

Since granted as the federal standard and re-granted every five years, the DES had existed as the standard. However, after 1997, as the security problem of the DES came to the fore, NIST started to develop AES as a replacement of the DES. AES has been granted as the US federal standard cryptographic algorithm, and been used worldwide.

To construct a secure cryptographic system, a block cipher and a hash function ensuring confidentiality and integrity are necessary. However, according to conventional cryptographic systems, a block cipher and a hash function are constructed as separate algorithms, and it is difficult to implement two primitives at the same time under a resource-limited environment such as RFID/USN of a ubiquitous computing environment.

For example, even though the hash function SHA and block cipher AES are US federal standard cryptographic algorithms, those two algorithms need to be implemented independently because design methods thereof are different from each other.

SUMMARY OF THE INVENTION

In view of the above, the present invention provides an integrated cryptographic module and a method thereof providing confidentiality and integrity, which is suitable for designing an integrated cryptographic module capable of using both a block cipher providing confidentiality and a hash function guaranteeing integrity in a resource-limited environment such as RFID (radio frequency identification) or USN (ubiquitous sensor network) of an ubiquitous computing environment.

In accordance a first aspect of the present invention, there is provided an integrated cryptographic apparatus providing confidentiality and integrity including: an integrated cryptographic module including a confidentiality and an integrity performances; a hash function unit for detecting whether a message is modified by using the integrated cryptographic module; and a block cipher unit for constructing a data cryptographic algorithm by using the integrated cryptographic module.

In accordance with a second aspect of the present invention, there is provided an integrated cryptographic method providing confidentiality and integrity including: generating a hash function for detecting whether a message is modified by using an integrated cryptographic module; and generating a block cipher for constructing a data encryption algorithm by using the integrated cryptographic module.

In accordance with an embodiment of the present invention, it is possible to provide confidentiality and integrity by using a block cipher and a hash function in a resource-limited environment such as RFID (radio frequency identification) or USN (ubiquitous sensor network) in an ubiquitous computing environment. Further, it is possible to provide flexibility of selectively using the block cipher or the hash function in the integrated cipher module.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

Embodiments of the present invention will be described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

In the following description of the present invention, if the detailed description of the already known structure and operation may confuse the subject matter of the present invention, the detailed description thereof will be omitted. The following terms are terminologies defined by considering functions in the embodiments of the present invention and may be changed operators intend for the invention and practice. Hence, the terms should be defined throughout the description of the present invention.

Combinations of each step in respective blocks of block diagrams and a sequence diagram attached herein may be carried out by computer program instructions. Since the computer program instructions may be loaded in processors of a general purpose computer, a special purpose computer, or other programmable data processing apparatus, the instructions, carried out by the processor of the computer or other programmable data processing apparatus, create devices for performing functions described in the respective blocks of the block diagrams or in the respective steps of the sequence diagram.

Since the computer program instructions, in order to implement functions in specific manner, may be stored in a memory useable or readable by a computer aiming for a computer or other programmable data processing apparatus, the instruction stored in the memory useable or readable by a computer may produce manufacturing items including an instruction device for performing functions described in the respective blocks of the block diagrams and in the respective steps of the sequence diagram. Since the computer program instructions may be loaded in a computer or other programmable data processing apparatus, instructions, a series of processing steps of which is executed in a computer or other programmable data processing apparatus to create processes executed by a computer so as to operate a computer or other programmable data processing apparatus, may provide steps for executing functions described in the respective blocks of the block diagrams and the respective sequences of the sequence diagram.

Moreover, the respective blocks or the respective sequences may indicate modules, segments, or some of codes including at least one executable instruction for executing a specific logical function(s). In several alternative embodiments, is noticed that functions described in the blocks or the sequences may run out of order. For example, two successive blocks and sequences may be substantially executed simultaneously or often in reverse order according to corresponding functions.

Hereinafter, embodiments of the present invention will be described with reference to the accompanying drawings which form a part hereof.

Figure 1:
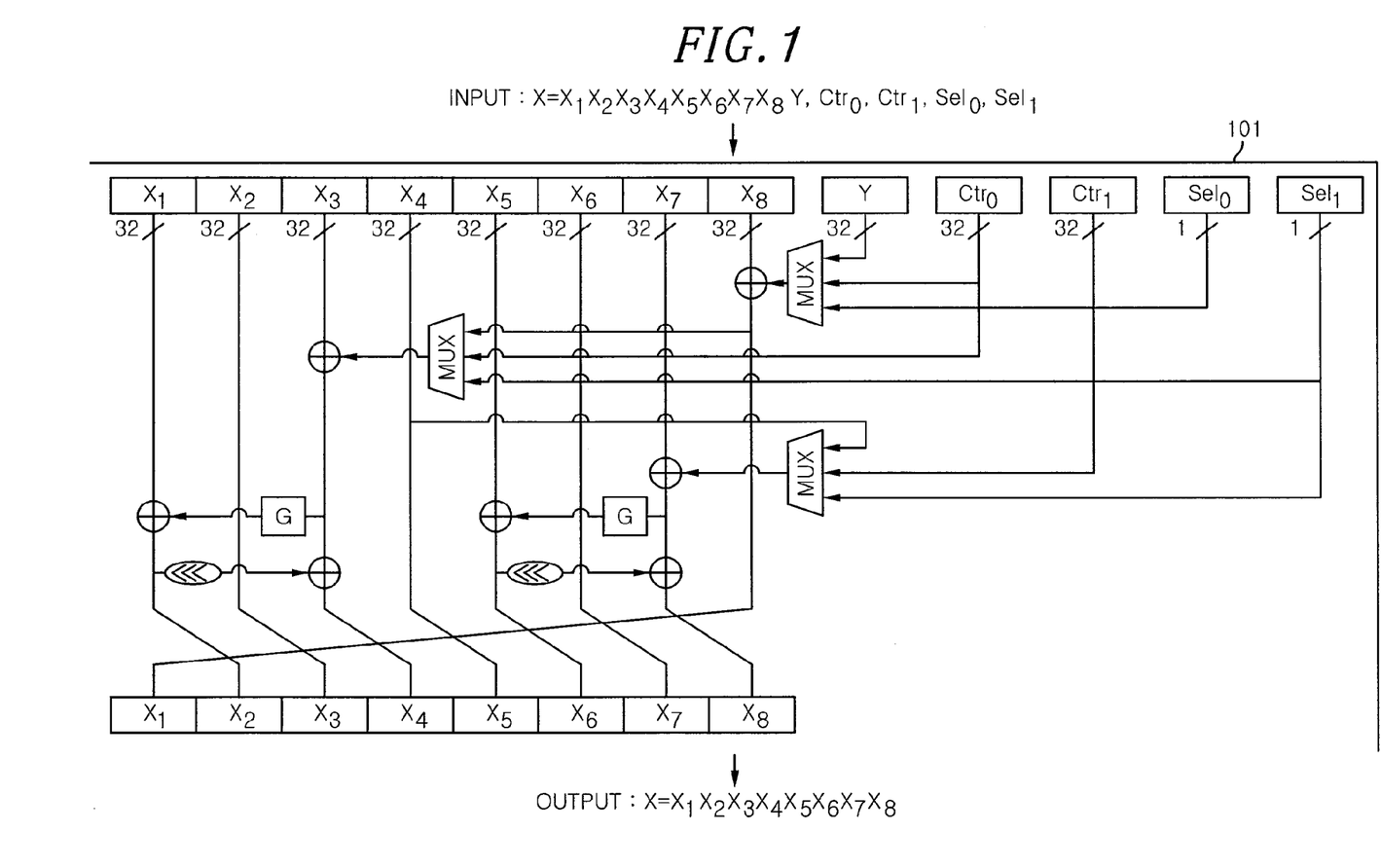
FIG. 1 is a basic structural diagram of an integrated cryptographic module ICM in accordance with an embodiment of the present invention.

FIG. 1 is a basic structural diagram of an integrated cryptographic module ICM according to an embodiment of the present invention.

Referring to FIG. 1, an integrated cryptographic module ICM 100 performs an operation as shown in Table 1, receiving inputs $X=X_1\|X_2\|\ldots\|X_8$, Y, $Ctr_0$, $Ctr_1$, $Sel_0$, and $Sel_1$.

Herein, X is 256 bits, $X_i (1 \le i \le 8)$, Y, $Ctr_0$, and $Ctr_1$ are 32 bit word, $Sel_0$, $Sel_1$ are 1 bit, and $\|$ is a concatenation operation.

TABLE 1

$ICM(X, Y, Ctr_0, Ctr_1, Sel_0, Sel_1)$
$X_8 = X_8 \oplus MUX(Y, Ctr_0, Sel_0) X_3 = X_3 \oplus MUX(X_8, Ctr_0, Sel_0)$
$X_7 = X_7 \oplus MUX(X_4, Ctr_1, Sel_1); X_1 = X_1 \oplus G(X_3); X_5 = X_5 \oplus G(X_7)$
$X_3 = X_3 \oplus X_1^{<<<11}; X_7 = X_7 \oplus X_5^{<<<17};$
$T = X_8; X_8 = X_7; X_7 = X_6; X_6 = X_5$
$X_5 = X_4; X_4 = X_3; X_3 = X_2; X_1 = T$ In Table 1, T is 32-bit word-temporary variable, $x^{<<<r}$ is an operation for circularly moving x by s bits to the left, $\oplus$ is an operation for XOR among 32-bit words.

$MUX(x,y,z)$ is a function for outputting x when z is 0, and outputting y when z is 1. A function G is for receiving a 32-bit word as an input and outputting a 32-bit word as an output. As the function G, a function having good confusion and diffusion property can be used. The function G can be constructed by combining S-box, which is a representative substitution function for confusion performance, and a permutation function for diffusion property.

Table 2 shows an example of performing 4×4 S-box operation for each 4-bit block generated by dividing 32-bit word input into 8 4-bit blocks.

TABLE 2

| S-box($x_0, x_1, x_2, x_3$) = ($x_0', x_1', x_2', x_3'$) | | | | | | | | | | | | | | | | |
|---|---|---|---|---|---|---|---|---|---|---|---|---|---|---|---|---|
| input | 0 | 1 | 2 | 3 | 4 | 5 | 6 | 7 | 8 | 9 | a | b | c | d | e | F |
| output | 8 | 4 | 2 | d | 1 | f | 7 | a | 5 | 9 | b | e | 6 | c | 0 | 3 |

Table 3 is an example of a permutation function for diffusion property with 32-bit word input divided into eight 4-bit blocks.

TABLE 3

$DL(w_0, w_1, w_2, w_3, w_4, w_5, w_6, w_7) = (w_0', w_1', w_2', w_3', w_4', w_5', w_6', w_7')$
$w_0' = w_1 \oplus w_2 \oplus w_3 \oplus w_4 \oplus w_7$    $w_1' = w_0 \oplus w_2 \oplus w_3 \oplus w_4 \oplus w_5$
$w_2' = w_0 \oplus w_1 \oplus w_3 \oplus w_5 \oplus w_6$    $w_3' = w_0 \oplus w_1 \oplus w_2 \oplus w_6 \oplus w_7$
$w_4' = w_1 \oplus w_2 \oplus w_3 \oplus w_4 \oplus w_5$    $w_5' = w_0 \oplus w_2 \oplus w_4 \oplus w_5 \oplus w_6 \oplus w_7$
$w_6' = w_0 \oplus w_1 \oplus w_3 \oplus w_4 \oplus w_6 \oplus w_7$    $w_7' = w_0 \oplus w_1 \oplus w_2 \oplus w_4 \oplus w_5 \oplus w_7$ Meanwhile, circular movement amounts used in a left-circular-movement operation in Table 1 are fixed constant different with each other, and the amounts are not limited to certain values, but can be selected among values having good diffusion property in view of cryptography.

Figure 2:
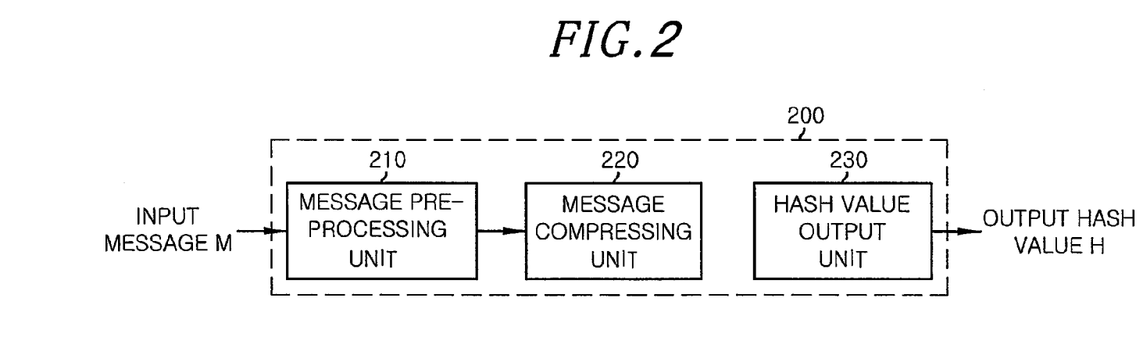
FIG. 2 is a block diagram showing a structure of a hash function unit providing integrity in accordance with an embodiment of the present invention.

FIG. 2 is a block diagram showing a structure of a hash function unit providing integrity in accordance with an embodiment of the present invention.

Referring to FIG. 2, a hash function unit 200 providing integrity includes a message pre-processing unit 210, a message compressing unit 220, and a hash value output unit 230.

The hash function unit 200 uses a 32-bit word operation. Therefore, in the first step, the message pre-processing unit 210 converts a bit string of arbitrary length into a 32-bit word array. In the second step, the message compressing unit 220 compresses the message converted into 32-bit word. In the third step, the hash value output unit 230 outputs a hash value of a length that a user desires to be.

In detail, the message pre-processing unit 210 converts a bit string of arbitrary length into a 32-bit word array. The message pre-processing unit 210 regards a 32-bit word array as a 4-byte string, so that a first byte becomes an most significant byte of a word.

For example, the bit string 10101101 01101011 11001001 10101110 becomes a 32-bit word W=ad6bc9ae. This is the same as a result of type casting 4-byte string in a type of 'unsigned long' in a big-endian computer.

When converting a bit string of an arbitrary length into 32-bit word array, it may be repeated to convert a first 4-byte into a first word, and a second 4-byte into second word, with regarding the bit string as a byte array.

For example, a bit string 10101101 01101011 11001001 10101110 00111111 01011001 01000110 becomes a 32-bit word array ad6bc9ae 3f594600.

If an input message is not a 32-bit multiple, 1000 . . . 000 can be filled in the input message to make the input message a 32-bit multiple. For example, when an input message is given as 10100010 00111101 11100101 01101011 11001001 10001010 10011101, the length of the input message is 56, 1 and 7 0's can be added to the input message to make the input message 64-bit. Therefore, the 32-bit word array of 64-bit can be given to be a239e56b c98a9d80.

Figure 3:
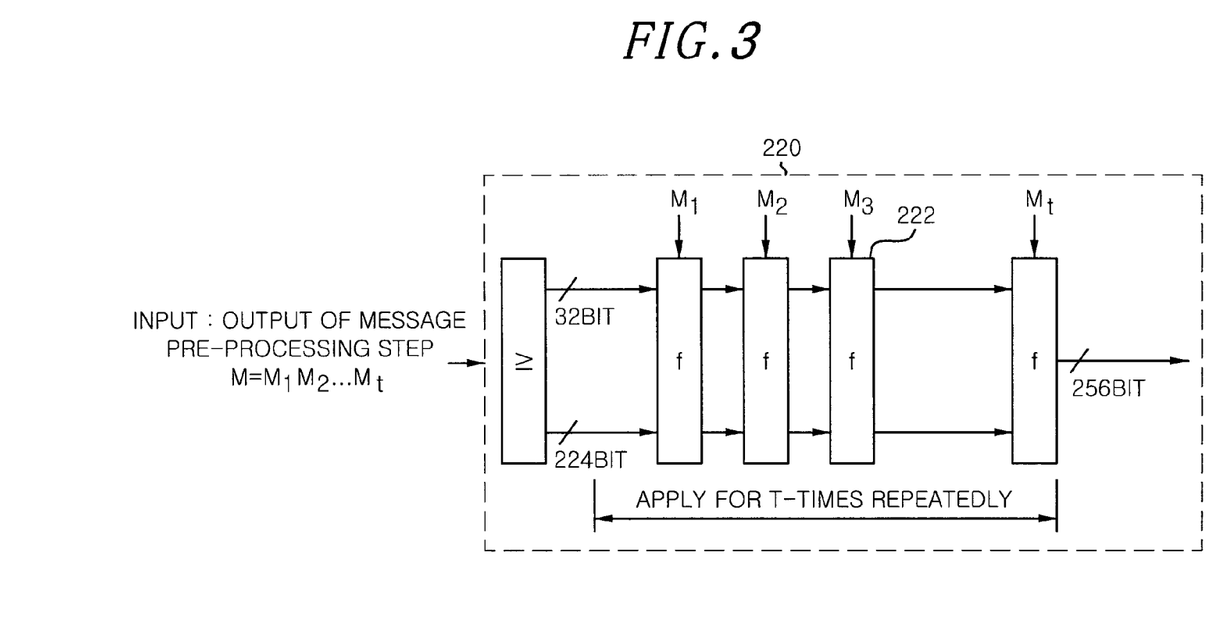
FIG. 3 is a diagram showing a message compressing unit in accordance with an embodiment of the present invention.

As shown in FIG. 3, the message compressing unit 220 sequentially compresses the message word array converted into 32-bit by the message pre-processing unit 210, by using a state updating function $f$ 222. If it is assumed that a 32-bit message word array converted by the message pre-processing unit 210 to be X=$X_1$||$X_2$|| . . . $X_t$, the message compressing unit 220 can be defined as Table 4. Herein, $M_i$ (1≤i≤t) is a 32-bit word.

TABLE 4

MCP(M)
$X_1$ = $IV_1$; $X_2$ = $IV_2$; $X_3$ = $IV_3$; $X_4$ = $IV_4$;
$X_5$ = $IV_5$; $X_6$ = $IV_6$; $X_7$ = $IV_7$; $X_8$ = $IV_8$;
for from i = 1 to i = t
f(X,$M_i$);

In Table 4, $IV_1$, . . . $IV_8$ are initial vectors fixed to be 32-bit words and are not limited to certain values.

Figure 4:
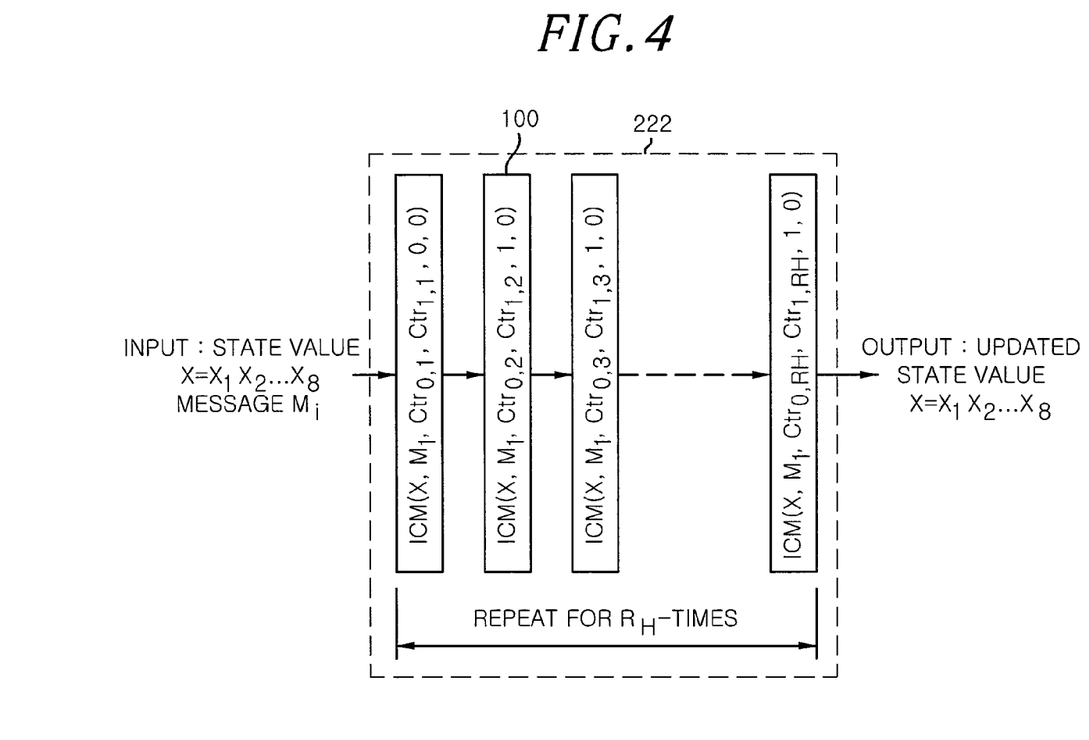
FIG. 4 is a diagram showing a state updating function used in a message compressing unit and a hash value output unit in accordance with an embodiment of the present invention.

The state updating function $f$ 222 is as shown in FIG. 4, and can be constructed by using the integrated cryptographic module ICM 100. The state updating function $f$ 222 updates a 256-bit X=$X_1$||$X_2$|| . . . ||$X_8$ (herein, $M_i$(1≤i≤8) is a 32-bit word) by using the integrated cryptographic module ICM 100.

The state updating function $f$ 222 can be defined as Table 5.

TABLE 5 f( X,$M_i$ )
ICM( X,$M_i$,$Ctr_{0,1}$,$Ctr_{1,1}$,0,0 );
for from i = 2 to i = $R_H$
ICM( X,$M_i$,$Ctr_{0,i}$,$Ctr_{1,i}$,1,0 );

The state updating function $f$ 222 updates X by applying the integrated cryptographic module ICM 100 for $R_H$-times repeatedly to inputs X and $M_i$. Herein $Ctr_{0,i}$ and $Ctr_{1,i}$ (1≤i≤$R_H$) are fixed constants different with each other, and are not limited to certain values. $R_H$ may be selectively used in a range that security of the hash function unit 200 providing integrity can be ensured.

Figure 5:
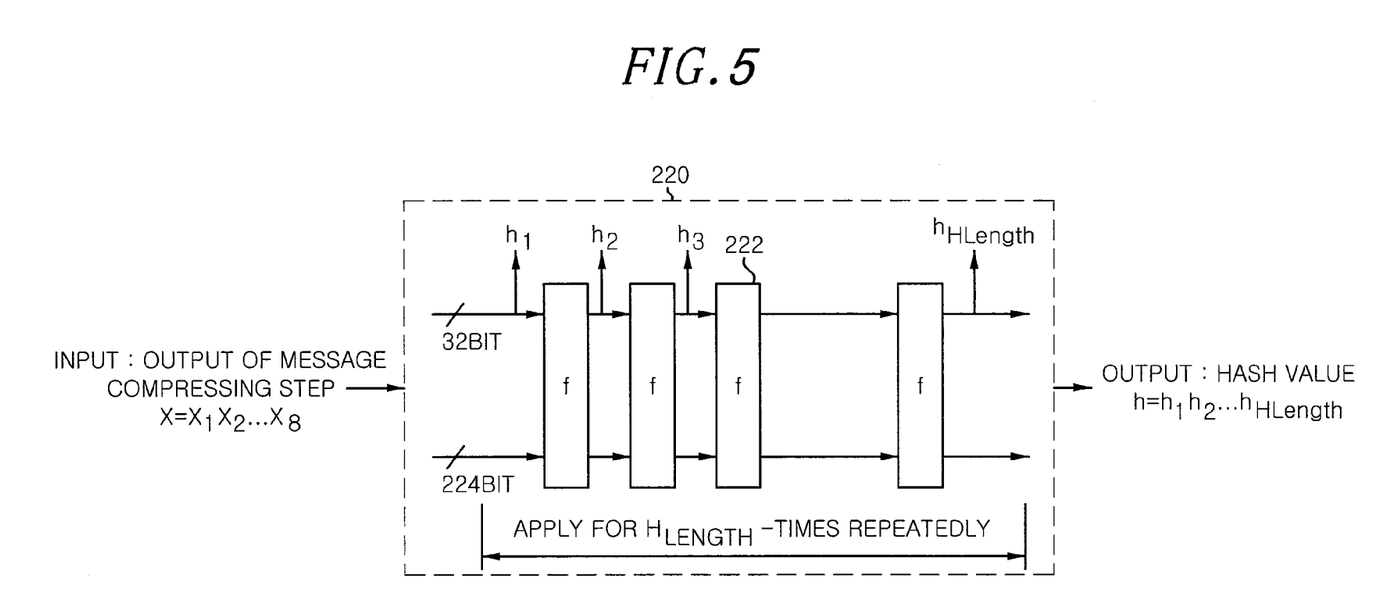
FIG. 5 is a diagram showing a hash value output unit of a hash function unit in accordance with an embodiment of the present invention.

The hash value output unit 230 is as shown in FIG. 5, and is a function for outputting a hash value of a desired length, after a compression by the message compressing unit 220. The hash value output unit 230 outputs a 32-bit word $h_i$ (1≤i≤8) with additionally performing the state updating function $f$ 222 by the desired length of hash function. The hash value output unit 230 can be defined as Table 6.

TABLE 6

Figure 6:
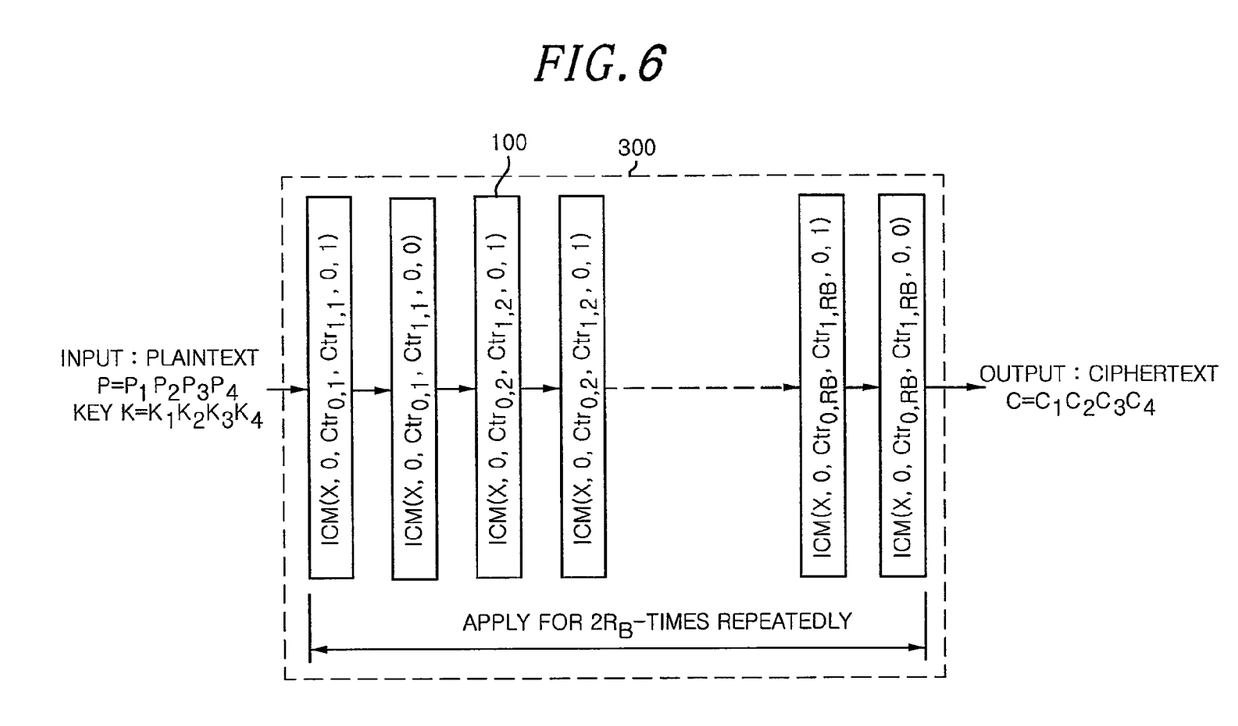
FIG. 6 is a diagram showing a block cipher unit providing confidentiality in accordance with an embodiment of the present invention.

HOP(X)
Out $h_1$ ← $X_1$;
if i > 1
for from i = 2 to i =$H_{Length}$
f( X,0 );
Out $h_i$ ← $X_1$;

When a length of a hash value is 32-bits, $h_1$ may be output being converted into bit string, as a hash value. When a length of a hash value is 64-bits, $h_1$||$h_2$ is output being converted into bit string. When a length of a hash value is 224 bits, $h_1$||$h_2$||$h_3$||$h_4$||$h_5$||$h_6$||$h_7$ is output being converted into bit array. In this case, each output variable $h_i$ satisfies $h_i$=$h_{i1}h_{i2}h_{i3}h_{i4}$ (wherein, $h_{ij}$ is 1-byte), the hash value may be converted as following byte array.
$h_{11}h_{12}h_{13}h_{14}h_{21}h_{22}h_{23}h_{24}h_{31}h_{32}h_{33}h_{34}h_{41}h_{42}h_{43}h_{44}h_{51}h_{52}$
$h_{53}h_{54}h_{61}h_{62}h_{63}h_{64}h_{71}h_{72}h_{73}h_{74}$ Hereinafter, a block cipher 300 providing confidentiality will be explained in detail step by step. The block cipher 300 is as shown in FIG. 6, and is a function for receiving a 128-bit plaintext P=$P_1$||$P_2$||$P_3$||$P_4$ and a 128-bit key K=$K_1$||$K_2$||$K_3$||$K_4$ as inputs and outputting a 128-bit ciphertext C=$C_1$||$C_2$||$C_3$||$C_4$. The block cipher 300 is defined as Table 7 by using the integrated cryptographic module ICM 100.

TABLE 7

BC( P,C,K )
$X_1$ ← $P_1$; $X_3$ ← $P_2$; $X_5$ ← $P_3$; $X_7$ ← $P_4$;
$X_2$ ← $K_1$; $X_4$ ← $K_2$; $X_6$ ← $K_3$; $X_8$ ← $K_4$;
for from i = 1 to i =$R_B$
ICM( X,0,$Ctr_{0,i}$,$Ctr_{1,i}$,0,1 );
ICM( X,0,$Ctr_{0,i}$,$Ctr_{1,i}$,0,0 );
$C_1$ ← $X_3$; $C_2$ ← $X_5$; $C_3$ ← $X_7$; $C_4$ ← $X_1$;

In Table 7, $Ctr_i$, $Ctr_{0,i}$ and $Ctr_{1,i}$ (wherein, 1≤i≤$R_B$) are fixed constants different with each other, and are not limited to certain values. $R_B$ may be selectively used in a range that security of the block cipher 300 providing confidentiality can be ensured.

As explained above, in accordance with an embodiment of the present invention, there is provided an integrated cryptographic module capable of using both a block cipher providing confidentiality and a hash function guaranteeing integrity in a resource-limited environment such as RFID (radio frequency identification) or USN (ubiquitous sensor network) in an ubiquitous computing environment.

An integrated cryptographic module according to an embodiment of the present invention, can construct a more efficient cryptographic system than conventional systems which need two independent algorithms. Moreover, the module can be implemented efficiently and securely with a simple operation in a limited environment such as RFID (radio frequency identification) or USN (ubiquitous sensor network) in an ubiquitous computing environment.

While the invention has been shown and described with respect to the embodiments, it will be understood by those skilled in the art that various changes and modification may be made without departing from the scope of the invention as defined in the following claims.

What is claimed is:

1. An integrated cryptographic apparatus providing confidentiality and integrity comprising:
    an integrated cryptographic module to receive an input bit string, and to output an output bit string after subjecting at least a portion of the input bit string to a hash function and to a block cipher in an integrated manner;
    a hash function generator to detect whether a message is modified by using at least a portion of the input bit string received by the integrated cryptographic module; and
    a block cipher generator to construct a data encryption algorithm by using at least a portion of the input bit string received by the integrated cryptographic module,
    wherein the integrated cryptographic apparatus further includes at least one processor configured to execute one or more operations of the integrated cryptographic module, the hash function generator, and the block cipher generator.

2. The apparatus of claim 1, wherein the integrated cryptographic module generates outputs with respect to the input bit string by using operations including S-box, circular movement, and XOR.

3. The apparatus of claim 1, wherein the hash function unit generator includes:
    a message pre-processor to convert an input bit string of an arbitrary length into a 32-bit word array;
    a message compressor to compress the converted 32-bit word array; and
    a hash value generator to output a hash value of a certain hash length by using a value output from the message compressor.

4. The apparatus of claim 3, wherein the message pre-processor adds one 1 and at least one 0 to a last bit so that the input bit string becomes a 32-bit multiple.

5. The apparatus of claim 3, wherein the message compressor sequentially compresses a message converted into a 32-bit word array by using a state updating function.

6. The apparatus of claim 5, wherein the state updating function updates an input by repeatedly applying the integrated cryptographic module to the input.

7. The apparatus of claim 3, wherein the hash value generator performs a state updating function which corresponds to a length of the hash function.

8. The apparatus of claim 1, wherein the block cipher generator includes a function to output a 128-bit ciphertext by repeatedly applying the integrated cryptographic module to a 128-bit plaintext and a 128-bit key.

9. An integrated cryptographic method, comprising:
    generating, using at least one processor, a hash function for detecting whether a message is modified by using at least a portion of an input bit string received by an integrated cryptographic module; and
    generating, using the at least one processor, a block cipher for constructing a data cryptographic algorithm by using at least a portion of the input bit string received by the integrated cryptographic module.

10. The method of claim 9, further comprising, outputting, by the integrated cryptographic module, an output with respect to the input bit string by using operations including S-box, circular movement, and XOR.

11. The method of claim 9, wherein said generating the hash function includes:
    message pre-processing for converting an input bit string of an arbitrary length into a 32-bit word array;
    message compressing for compressing the converted 32-bit word array; and
    hash value outputting for outputting a hash value of a certain hash length by using a value output from the message compressing unit.

12. The method of claim 11, wherein said message pre-processing comprises adding one 1 and at least one 0 to a last bit so that the input bit string becomes a 32-bit multiple.

13. The method of claim 11, wherein said message compressing comprises sequentially compressing a message converted into a 32-bit word array by using a state updating function.

14. The method of claim 13, wherein the state updating function updates an input by repeatedly applying the integrated cryptographic module to the input.

15. The method of claim 11, wherein said hash value outputting comprises performing a state updating function which corresponds to a length of the hash function.

16. The method of claim 9, said generating the block cipher is a comprises outputting a 128-bit ciphertext by repeatedly applying the integrated cryptographic module to a 128-bit plaintext and a 128-bit key.

17. The apparatus of claim 3, wherein the input bit string received by the integrated cryptographic module includes a plurality of 32-bit word inputs, and
    the 32-bit word array converted by the message pre-processing unit corresponds to the plurality of 32-bit word inputs.

18. The apparatus of claim 17, wherein the block cipher generator outputs an n-bit ciphertext based on an input comprising an n-bit plaintext and an n-bit key, and
    the n-bit plaintext corresponds to a portion of the plurality of 32-bit word inputs and the n-bit key corresponds to a remaining portion of the plurality of 32-bit word inputs.

* * * * *